Nov. 3, 1964  G. E. FOSTER  3,155,950
MULTIPLE SIGNALLING ANNUNCIATOR
Filed Feb. 19, 1960  5 Sheets-Sheet 1
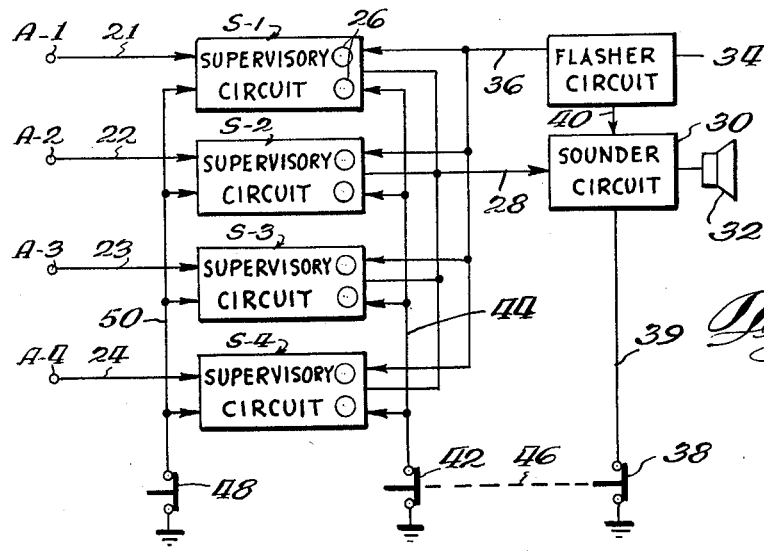
Fig. 1.
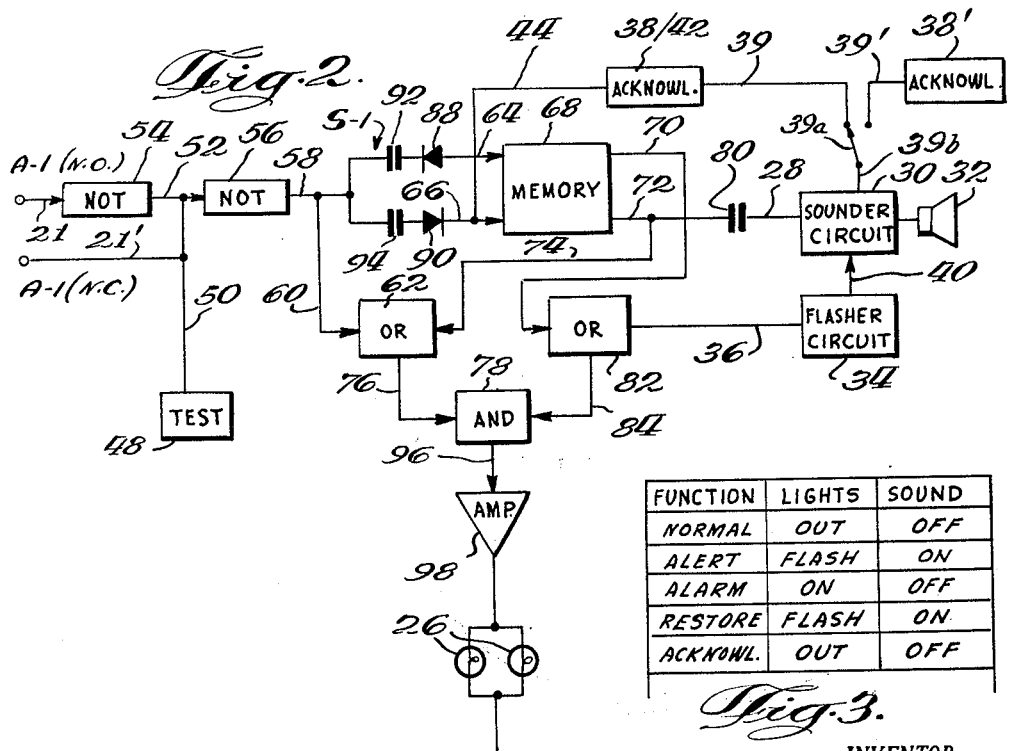
Fig. 2.
| FUNCTION | LIGHTS | SOUND |
|---|---|---|
| NORMAL | OUT | OFF |
| ALERT | FLASH | ON |
| ALARM | ON | OFF |
| RESTORE | FLASH | ON |
| ACKNOWL. | OUT | OFF |
Fig. 3.
INVENTOR.
George E. Foster
BY
Silverman, Smullin & Coss
Attorneys INVENTOR.
George E. Foster

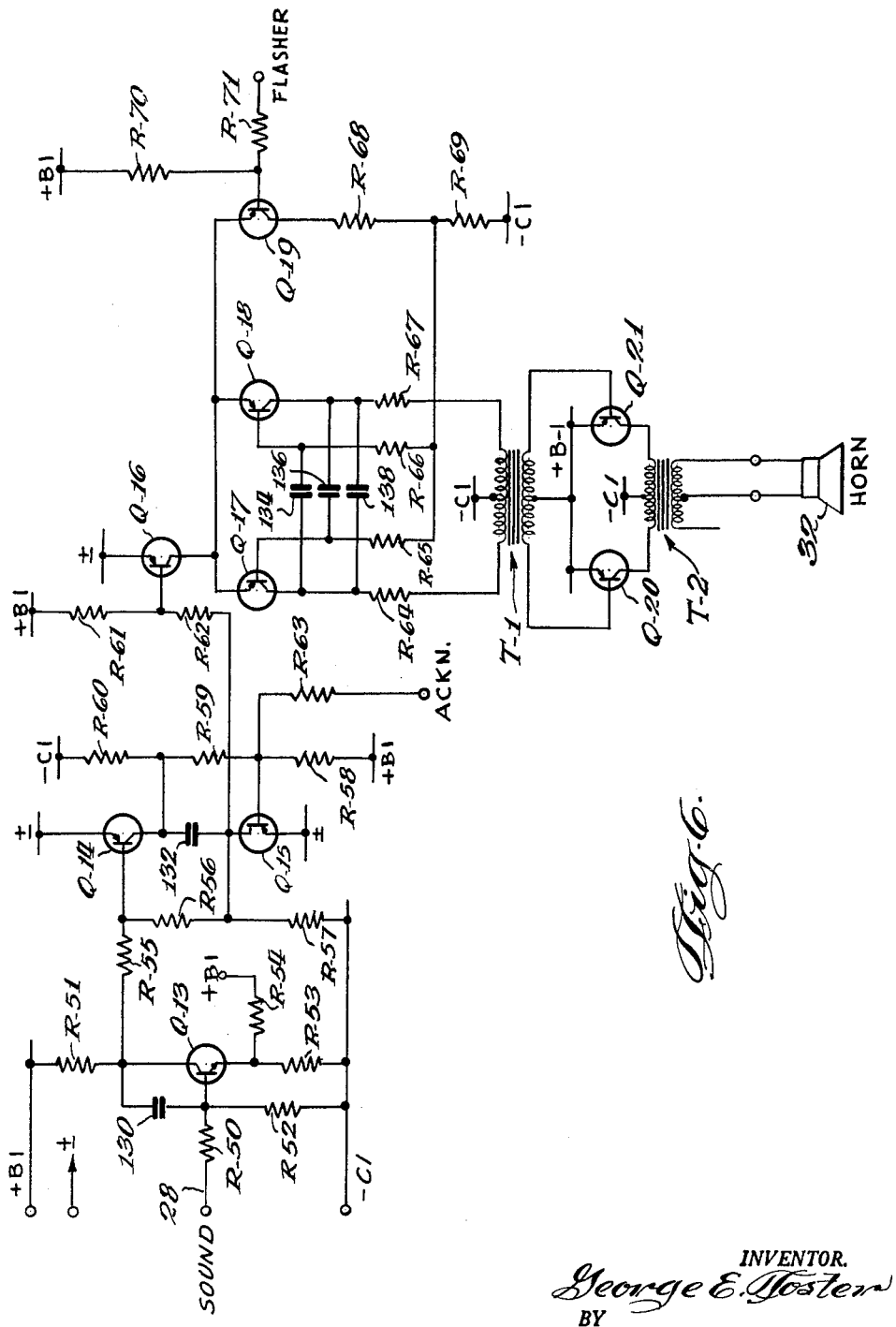

Nov. 3, 1964  G. E. FOSTER  3,155,950
MULTIPLE SIGNALLING ANNUNCIATOR
Filed Feb. 19, 1960  5 Sheets-Sheet 5
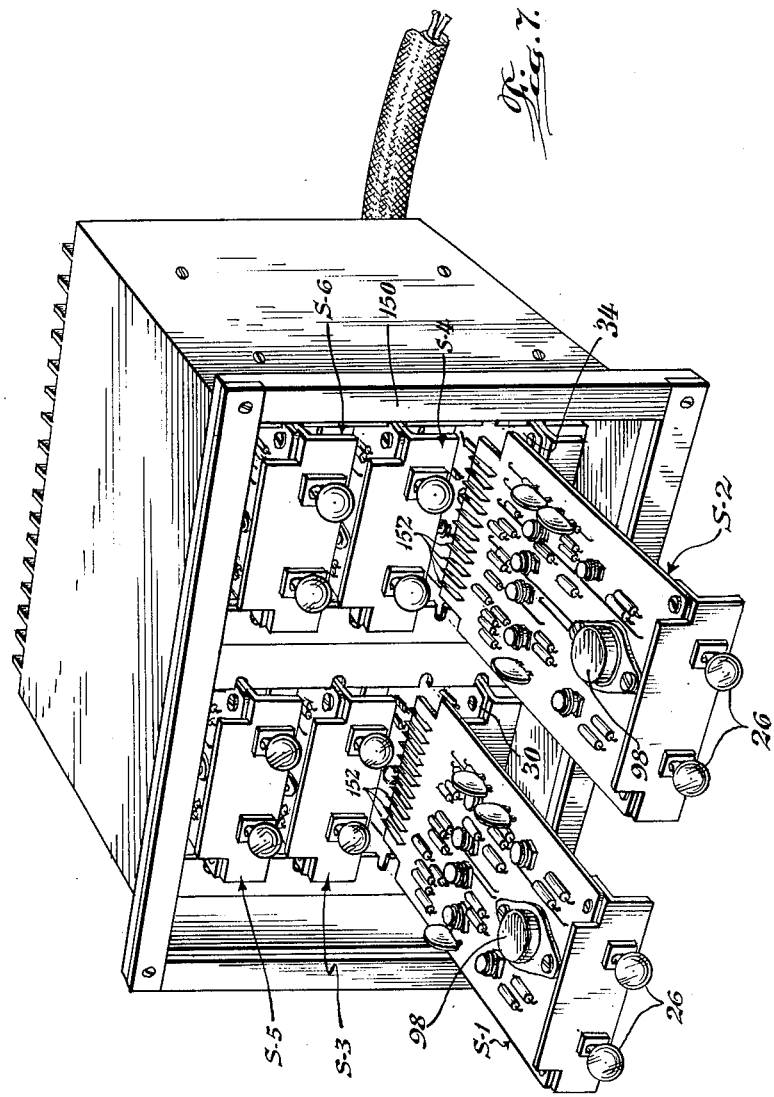

United States Patent Office 3,155,950
Patented Nov. 3, 1964

3,155,950
MULTIPLE SIGNALLING ANNUNCIATOR
George E. Foster, 7917 S. Yale, Chicago, Ill.
Filed Feb. 19, 1960, Ser. No. 9,925
4 Claims. (Cl. 340—213.2)

This invention relates generally to annunciators and more particularly is concerned with the type of annunciators which are used for the purpose of providing an audio and/or visual alarm or indication to signal that an abnormal condition has arisen in a system, process or machine or group thereof under surveillance.

In many industrial processes, systems and machines it is impossible for the parts and components thereof to be under continuous supervision for detecting abnormal or unusual conditions which could damage the apparatus or equipment, give rise to dangerous conditions, or result in the loss or damage of the product. In the present-day trend toward automation, automatic and unattended processes and sequences of operations, and the like, the need for alarms provided by annunciators or annunciator systems is especially important. Examples of such systems are heat-treating operations of all kinds of metals and finishes; chemical processes of all kinds for cracking petroleums, producing various gases, synthesizing materials, and manufacturing all manner of organic and inorganic substances; power plants, operating through water power, nuclear power, steam, and the like; mechanical processes involving the performance of many operations in various sequences. Even relatively simple installations may have a plurality of danger points at scattered locations.

The annunciators with which this invention is concerned are also useful for the surveillance of many points and conditions in the same or different locations, which are not necessarily related one to the other either structurally or functionally, but which for some reason or the other are under control and observation at a single location. An example of this could be a system of many power stations each having a large number of electrical quantities which are to be recorded in the office of a central location, and the information of which is obtained by transducers which are periodically scanned by some automatic means, and the information transmitted to automatic recording means in said office. In this case, the entire system may be completely unattended such that the occurrence of abnormal conditions may not readily or quickly be detected before serious damage occurs or false information is transmitted.

In any event the purpose of the annunciator is to call the attention of the operator to some abnormal or unusual condition by means of horns, bells, buzzers, lights —either colored or otherwise, and either flashing or steady, semaphores, or combinations of these. The indicating means are also required to localize the source of abnormal condition in addition to informing the operator that an abnormal condition has occurred.

Prior annunciators have had a great many disadvantages which have rendered them expensive, unreliable, complex to manufacture and install, and in general not completely satisfactory for substantial universal use and hence not flexible. It has been necessary in the past to build special annunciators for the particular system it was desired to protect because of the requirements of the divers systems. Annunciators have previously been constructed using flags or drops or relays to provide the desired functions. A typical example, with which practically everyone is familiar, is the call system on most railroad sleepers where the porter has a display of flags or lights which are normally not operating. When a patron presses the button in his room, a buzzer or bell sounds, and a light lights or flag drops corresponding in location or number to the location of the patron's room. The visual condition obtains until the porter presses a button to reset his call board.

The flag or indication is normally held in a restrained state by a latch or the like. This condition is obtained by means of a relay that is magnetically, electrically or mechanically locked in place. Either the relay is relaxed and upon operation locks itself into its alarm condition by the occurrence of the condition, or it can be energized normally, and de-energized by the alarm condition. In the first case, the operator will reset the relay by opening the lockup circuit, that is the circuit which energized the relay. In the second case, the operator will energize the relay after it has been opened by the alarm circuit.

In most cases two relays are required as a minimum number in order to show both the normal and abnormal states. In many cases the contacts of the relays are either direct acting contacts or enclosed mercury switches where an explosive atmosphere may be encountered. In addititon to the expense of these structures, the notorious unreliability of mechanical engagement between electrical contacts has made such annunciators undesirable, especially where there are a large number of conditions which must be supervised and especially where abnormal conditions may occur in rapid succession at different points.

The modern annunciator is required to provide a flashing light in addition to an audible signal. The usual annunciator system has in the past had the electric light current provided by a common flasher circuit, which means that when a large number of lights are flashing, the flasher has to break a circuit with heavy current, leading to short life of the flasher.

Annunciators are not required to operate frequently. Their condition in practically all cases is that of standby, but when they do work, their importance is so great to safety of materials, equipment and personnel, that it is imperative that their operation be as perfect as possible. Frozen and corroded contacts and inoperative circuits caused by no operation for a long period of time can be quite costly when the annunciator fails to respond to the rare abnormal signal it is intended to announce and locate. To offset this, large sums of money are spent in building expensive and involved annunciators which will positively operate, including alternate and duplicated parts, enclosed and encapsulated components, and the like. Likewise complex testing systems have increased the expense of the prior annunciators, in the effort to ensure reliability of operation.

The primary object of the invention herein is to substantially eliminate all of the disadvantages enumerated above by providing a novel annunciator construction of substantially universal applicability which occupies exceedingly small space; which uses exceedingly low power for its operation; which has no moving parts or relays; which is simple in its construction and maintenance; which is economical to build on a high speed production basis; which enables a modular construction of an annunciator system to be readily built and expanded whenever desired; and which is completely dependable and reliable.

Other objects of the invention are concerned with the provision of a novel annunciator system which has an unusual testing structure combined therewith such that all of the circuits of the annunciator system may be tested at any time, either while any one or more of them may be in use, or when none are in use. Ancillary to this object is the provision of a novel testing circuit.

An important object of the invention is the provision of a novel annunciator circuit which uses static control elements to perform logic functions, and arranging these elements to provide all of the desired eventual purposes of the annunciator without the use of relays or switches in the circuit, other than for reset or other manual change of condition operations which must be performed by the operator. The reset circuit need not be a manual switch but could be a static device, as well-known.

Still further objects herein are the provision of novel sub-circuits and structures of the components of the annunciator, including the flasher circuit, and the like; the provision of an annunciator circuit in which the flasher signal occurs as a part of a logic sequence at a low power level part of the circuit, such that its requirements of power are very low irrespective of the number of circuits being energized; the provision of an annunciator system in which a circuit-light operated by the flasher may be converted to a steady light by a suitable re-set switch without affecting any other circuit such that other circuits will still produce a flashing light upon the occurrence of abnormal conditions therein.

Other objects are concerned with the provision of novel circuit arrangements to perform the logical functions in certain sequences whereby to achieve advantages such as economy and efficiency, as for example, providing an arrangement so that the flasher circuit may be producing and applying a continuous flashing signal which is only manifest in the flashing lights under certain conditions of the circuit.

An important object of the invention is the provision of circuitry utilizing solid state elements comprising transistors and diodes to form the static control elements of the annunciator and to achieve the logic functions which will be described.

Many other objects will occur to those skilled in this art as the description proceeds, in connection with which preferred embodiments of the invention have been set forth in considerable detail and illustrated in the accompanying drawings in which:

FIG. 1 is a block diagram of an annunciator system arranged for the supervision or surveillance of four alarm points, the system embodying the invention herein.

FIG. 2 is a logic block diagram of one of the supervisory circuits of the system of FIG. 1, the sounder and flasher circuits being included in order to enable an explanation of the operation of the device.

FIG. 3 is a chart illustrating the sequence of events and functions of the block diagram of FIG. 2.

FIG. 6 is a circuit diagram of the sounder circuit of FIG. 1.

FIG. 7 is a perspective view of a practical embodiment of the invention, showing the manner in which a module arrangement is advantageous to mount all circuits in one cabinet.

Figure 4:
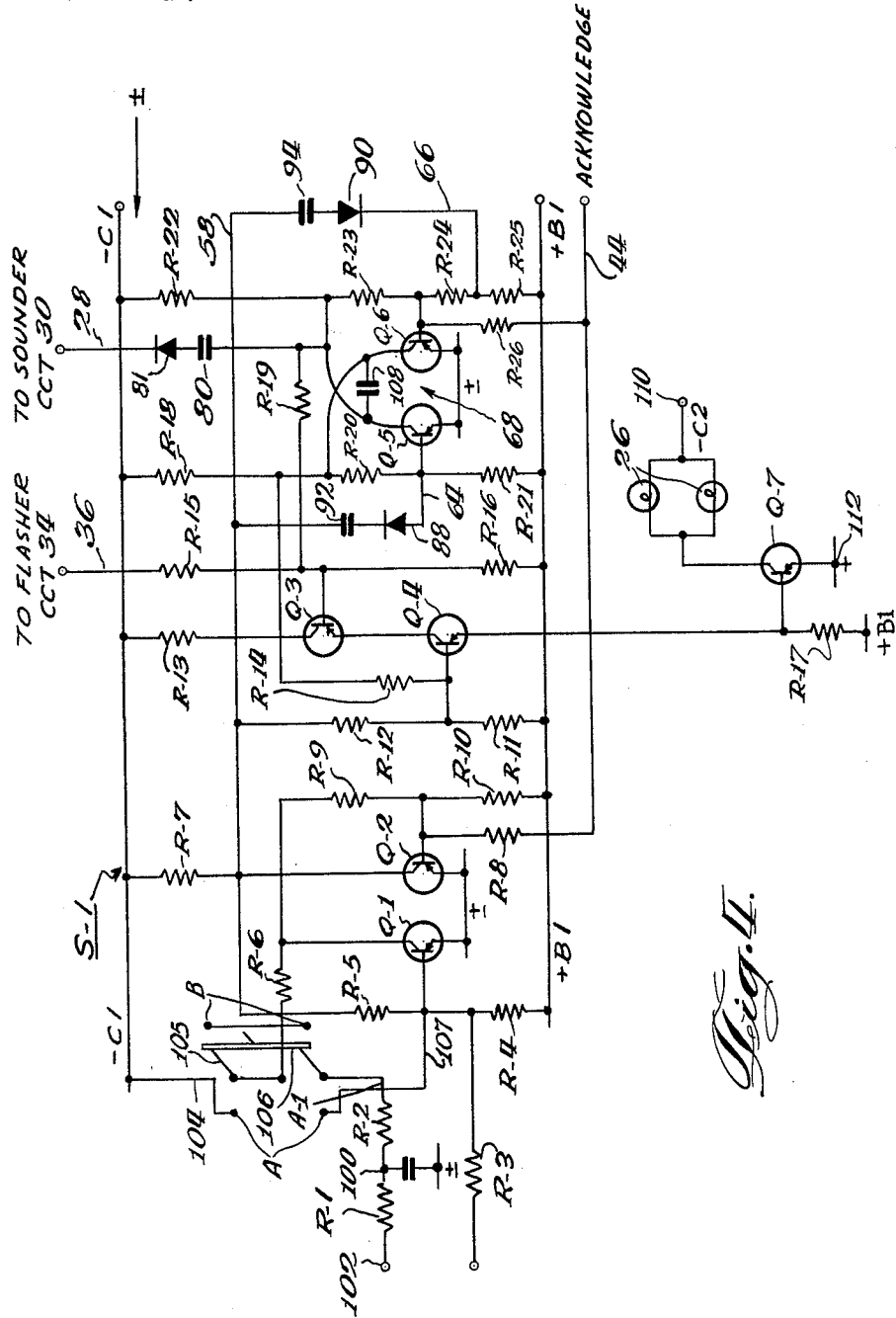
FIG. 4 is an actual circuit diagram of the supervisory circuit of FIG. 2.

As stated above the invention is characterized by the provision of an annunciator formed primarily of static control elements which have no moving parts and which thereby eliminate all the troublesome mechanical difficulties which are inherent in relays, magnetically or mechanically operated contacts and the like. The construction of annunciator systems using such elements enables said systems to perform functions which are not practical through the use of relays and the like, among which are speed and positiveness of response, the construction of systems which can be tested easily during operation, the construction of modular systems and the like.

Prior to proceeding with the discussion and description hereinafter several definitions should be made. The designation "annunciator" is not intended to be limited in any respect, either to a system which has several alarm circuits which are under surveillance or to an arrangement in which there is only one alarm circuit to be supervised, one light and/or one sounder. In the claims, when reference is made to an annunciator, it will be intended that either a single circuit or a system of multiple circuits will be included. In the description reference will be made to a "supervisory circuit." As presently to be seen, a supervisory circuit is required for each alarm circuit or point in a system, this supervisory circuit being the group of static control elements or arrangement of logic elements having particular functions, which activates the lamps of the particular circuit to achieve any of the three conditions comprising "out," "flash" and "steady." The supervisory circuit also controls the sounder device, but as readily could operate and control other indicating means.

The heart of an annunciator is its memory which remembers a condition having occurred and can compare the occurrence of a new condition therewith. Through the use of suitable logic circuits an indicator can be caused to operate to show the change in condition. The simplest form of memory circuit would be a holding relay which is quiescent and which, when actuated to close a circuit, will keep that circuit closed as long as the relay is held. When the holding circuit is opened, the relay returns to quiescent condition. While it is in held condition, any desired operation dependent upon the closed circuit may at any time be performed after the original condition has ceased. This is a somewhat simplified explanation, but the concept will become readily perceived as the description proceeds.

The invention herein will be described in connection with circuits utilizing static control devices applying the principles of solid state electronics. In place of apparatus such as transistors and diodes, which at the present time comprise the type of solid state devices referred to, there are other static devices which utilize magnetic and electromagnetic circuits suitable for use in logic circuits. The basis for circuits of this type is a magnetic core having a substantially rectangular hysteresis characteristic and connected with diodes and the like to provide the necessary functions. These structures are objectionable for several reasons, principally being the fact that it is difficult to determine steady state output from the core. It is usually necessary to erase the information of the occurrence of an event and then rewrite it—that is re-apply it to the core. This introduces complexity into the circuit which adds to the cost. In addition the fabrication of magnetic cores for this purpose is difficult, such cores being usually toroidal, and the basic costs are high. Such devices heat up rapidly. High speed production of such structures has not yet been attained in industry.

Solid state devices, although active elements as opposed to fully passive elements such as resistors, capacitors and the like, can accomplish the desired functions without the use of any moving parts; require little or no power during stand-by conditions; and even during operation their power requirements are quite low. The novel manner of using the same in the particular components of the apparatus herein will be described below.

Consider FIG. 1 of the drawings which is a diagrammatic block diagram of an annunciator system embodying the invention. In this system there are four alarm points which are to be under surveillance by the system and these alarm points are connected to the supervisory unit by suitable channels or circuits. The alarm circuits may be connected to the system at the terminals which are symbolically indicated at A–1, A–2, A–3 and A–4. It will be appreciated that the number of such terminals is merely a matter of choice, since there may be any quantity. The system will operate with only one point, if desired.

The terminals A–1, A–2, A–3 and A–4 are shown connected to four supervisory circuits, designated respectively S–1, S–2, S–3 and S–4 by suitable channels or conductors 21, 22, 23 and 24 respectively, the arrows signifying that there is an input signal applied to the circuits. This input, it should be explained, may consist of a signal or the absence of a signal, since the annunciator of the invention is so constituted that it is of little or no consequence to the operation and efficiency of the device whether the alarm circuit is normally open or normally closed such that the abnormal condition will be closed and open, respectively.

Each of the alarm circuits is arranged to be converted from its normal to its abnormal condition upon the occurrence of some change in the system, process or machine with which the alarm circuit is associated. As examples of such changes, a furnace could become extinguished and open or close a circuit, a temperature could increase or decrease to some critical value and likewise cause the opening or closing of an alarm circuit, etc. Any abnormal departure of a condition can be converted readily into or represented by the closing or opening of an alarm circuit to provide an input signal or absence thereof for the operation of the annunciator of the invention.

Each supervisory circuit S–1, S–2, S–3 and S–4 has a pair of lights to indicate alarm or the like as shown at 26. Each supervisory circuit is also connected to an output channel 28 for applying an input signal to (or removing a signal from) a sounder circuit 30 that drives a horn or other audible device 32. A flasher circuit 34 which is continuously operating applies a signal of intermittent nature to all of the supervisory circuits by way of the channel 36. Certain conditions of the supervisory circuits normally render the effect of the continuous intermittent signal provided by the flasher circuit 34 of no consequence. Two other conditions of each of the supervisory circuits will cause the signal applied by way of the channel 36 to flash the lights 26 or to cause the lights to be continuously on. All of the supervisory circuits S–1, S–2, S–3 and S–4 are identical normally, although special installations with modifications and refinements of the circuit can be made.

The horn 32 may be turned on or off, or may warble, if desired. Usually the sounder circuit 30 has a memory element therein which causes the horn 32 to sound continuously (or warble) once the alarm circuit of any alarm point is placed in abnormal condition. The state of the memory element is changed by a suitable acknowledge switch 38 which may open (or close) a suitable connection in the sounder circuit by way of channel 39 to perform the desired function of discontinuing operation of the sounder circuit 30. Warble of the sounder circuit may readily be accomplished by connecting an output from the continuously operating flasher circuit 34 to the sounder circuit, as indicated at 40. Due to the unique circuit arrangement provided herein horn 32 may be caused to warble responsive to successive alert conditions from different circuits. Thus the warble alerts the attendant to an existent abnormal condition and thereafter the warble may be turned off responsive to the acknowledgment operation, but if a second circuit should develop an abnormal condition the warble is reinstated under control of the supervisory circuit associated with the location at which the new abnormal condition developed despite previous operation of the acknowledgment switch. The attendant thereby knows that another location has developed an abnormal condition by the new alert condition of the annunciator. In order to do this the present invention incorporates an unusual arrangement for disabling the signal to the sounder from the first supervisory circuit despite the continuation of an abnormal signal applied thereto so that each successive warble operation of the sounder indicates an alert condition at respective locations.

The supervisory circuits all have a common acknowledge switch 42 operating into an input channel 44 to open (or close) a suitable connection in the supervisory circuits for changing the conditions in the said circuits. For example, the energized condition of the circuits, with lights 26 flashing, may be changed to a stand-by condition with the lights steady. The condition of steady lights may be changed to flashing lights or to no light under certain circumstances by the use of the acknowledge switch 42. Conveniently, the two acknowledge switches 38 and 42 may be ganged as indicated at 46. Alternatively of course the acknowledgment switch 42 may be made individual to each supervisory circuit. In addition it will be noted that the connection from the acknowledgment lead 44 through resistor R–8 to transistor Q–2 shown in FIG. 4 is optional, as may readily be appreciated, and the purpose in omitting this connection, if desired, will become apparent. At this time it will also be pointed out that the acknowledgment switches may on operation preferably supply a timed signal in any well known manner, whose duration is constant regardless of the time the acknowledgment switch is held operated.

The test switch 48 applies a test signal (or removes a normally existing signal) as an input on the channel or bus 50 to set all lights flashing and the horn 32 sounding. Acknowledge switches can readily stop all of this, as will be explained.

In FIG. 2 there is illustrated a logic block diagram, which embodies the invention applied to the construction of one of the supervisory circuits, such as for example, the circuit S–1. This circuit is connected by the channel 44 to the acknowledge element 38/42 which is shown as a single block for convenience. It is also connected to a sounder circuit 30 and horn 32 by way of channel 28, as shown in FIG. 1, and is also connected to the flasher circuit 34 by the channel 36. The connection 40 is the same as in FIG. 1. For the convenience of the operator in selecting alternative acknowledgment channels, there is provided a switch 39a, shown thrown to a position for a connection of sounder circuit 30 to acknowledge element 38/42 by way of lead 39b. In the alternate position of switch 39a, this connection is to acknowledgment element 38' by way of lead 39'.

Input to the supervisory circuit S–1 is by way of the terminals A–1, one of these being marked (N.O.) signifying that this is for an alarm circuit which produces no signal until the abnormal condition occurs; the other being marked (N.C.) signifying that this terminal is to be connected with an alarm circuit that produces a signal normally, and the signal discontinues when the abnormal condition occurs. The conventional meanings are "normally open" and "normally closed."

Before commencing the discussion of FIG. 2, the definition of the logic elements there shown should be set forth. The four important logic elements perform functions that depend upon their circuitry and the nature of their inputs. The functions are manifest as outputs or absence of outputs. These elements are NOT, OR, AND and MEMORY. The NOT elements provide an output signal when there is no input signal, and vice versa. (Inputs are marked in each case with arrows). The OR elements provide an output signal when any of the input channels receives a signal. The AND element provides an output signal only when all of its input channels have input signals.

The MEMORY element is somewhat complex. In the particular circuit it has two inputs and two outputs. The normal condition of the MEMORY element is with a signal at one output and no signal at the other. A pulse of proper polarity to either of the inputs will change the state of the MEMORY element, so that the one output will now have no signal, while there will be a signal at the other output. The change of state in the circuit S–1 occurs only when the proper polarity pulse is applied to the inputs of the MEMORY element, but the output conditions are continuous.

With the above in mind we can examine the circuit S–1. The normal condition of the circuit is with no signal at 21 or a signal at 21'. In either condition, there will be a signal at 52, because with no input to the NOT element 54 there will be an output. The NOT element 56 having an input at 52 will provide no output signal at 58 so that the input channel 60 provides no signal input to the OR element 62. For any steady state conditions there will be no signals at either of the inputs 64 and 66 of the MEMORY element 68 and the output channels 70 and 72 may be assumed to have an output at 70 and no output at 72. The channel 74 provides no output to the OR element 62 and hence, since neither of the inputs to the said OR element 62 has a signal applied, there can be no output on the channel 76 to the AND element 78.

The above explanation will suffice to show that the AND element 78 cannot have an output at 96 for normal condition. For explanatory purposes, however, it is best to describe the remainder of the logic diagram for this condition.

For normal condition, the sounder circuit 30 is inoperative, since the input channel 28 thereto, which is connected through capacitor 80 to the output 72 of the MEMORY element 68 has no signal applied. As a matter of fact, it would be immaterial whether there were a signal at 72, since the condenser 80 prevents D.C. signals from reaching the sounder circuit. Only pulses caused by a change of signal, i.e., from signal to no-signal condition or vice versa, will activate or trigger the sounder circuit. As will be seen hereinafter, once triggered, the sounder circuit will operate until stopped from some source other than its input channel 28.

Continuing with the explanation of the logic diagram for normal condition, the flasher circuit 34 is always producing an interrupted signal on lead 36 which enters the OR element 82. The other input to the OR element 82 is provided by the channel 70 from the MEMORY element 68 which is a steady or D.C. signal. This signal overrides the intermittent signal applied through channel 36 so that the output from OR element 82 is a steady signal at the channel 84 providing an input to the AND element 78. As explained, the AND element 78 is not capable of being activated under normal conditions because the input at 76 is absent.

The normal condition described is shown in the first line of the chart of FIG. 3, the lights being out and the sound being off.

The next condition to be described is shown in the second line of the chart of FIG. 3 and is identified as ALERT, in which the lights are flashing and the sounder is sounding. This occurs when the normal condition of the alarm circuit is changed to abnormal, either opening or closing the circuit, depending upon which kind it is. The abnormality may be a fault of some kind or a failure of some apparatus, which occurs either momentarily or continuously. The particular circuit which is being described will react under alert condition the same way irrespective of whether the abnormality is momentary or not.

The occurrence of a signal at A-1 (N.O.) or the absence of a signal at A-1 (N.C.) will in either event result in an absence of signal at 52, a signal being produced at 58, a signal being applied to the OR element 62 and the OR element 62 producing a signal at 76 to provide the left hand input to the AND element 78. At the instant of change of condition of the point 58 from a no-signal to a signal condition, there will be a pulse applied to both of the diodes 88 and 90 through the capacitors 92 and 94 respectively, but due to the polarization of the diodes, the only signals that can be applied at 64 are always negative signals, and the only signals that can be applied at 66 are positive signals. The change from no-signal to signal conditions produces a positive pulse which gives an input at 66 and is rejected by diode 88 and hence produces no input at 64. If there is an opposite change, the pulse would be negative and hence would be applied to input 64 and be rejected by the diode 90.

The left hand side of the MEMORY element 68 is therefore a one-condition arrangement, capable of changing the state of the MEMORY element 68 from normal to abnormal condition, but incapable by itself of restoring the original state. The pulse input at 66 being positive will change the state of the element 68 so that the output 70 will no longer have a signal thereon, while the output 72 will suddenly have a signal. This state remains thereafter irrespective of what happens to the channel 58 and hence irrespective of whether the fault causing the abnormality is steady or momentary.

The change of condition of the output 72 produces a pulse that passes through the condenser 80 and appears at input 28 to trigger the sounder circuit 30. It will be noted that before the change in output occurs at 72 that the charge on condenser 80 is held at a predetermined value, but when the memory 68 changes state or condition, the charge on the condenser alters, thereby transmitting a signal to the Sounder Circuit 30 through diode 81. The condenser 80 thus swings towards the neutral potential indicated at ± to apply a corresponding pulse to transistor Q-13 which initiates conduction to operate the sounder. Thereafter the charge on the side of condenser 80 connected to diode 81 leaks off and it is held in this condition as long as Q-5 conducts. If desired, a very high value resistor may be used in shunt with diode 81. By making the condenser 80 and associated diode 81 a one shot signal transmission circuit, lead 28 is permitted to transmit signals from other supervisory circuits to the Sounder 30. A diode such as 81 of course is connected between each supervisory circuit S-1, etc. and the common Sounder Circuit 30 to prevent feed back between the supervisory circuits. It will be appreciated that when using relays the problem of providing selective control of the sounder is not nearly as severe as when using control signals fed to the sounder over a common conductor such as 28, while on the other hand the common conductor herein provides a great many economies. At the same time a signal is applied to the channel 74 and into the OR element 62, which in the case of a continuing fault does not need such signal because the OR element 62 is already producing an output at 76. The absence of signal at 70 removes the overriding steady signal input to the OR element 82, and hence the output of the OR element 82 is an intermittent signal at 84 produced by the continuously operating flasher circuit.

The flasher circuit 34 also has made the sounder circuit 30 vary in its output at an audio rate superimposed upon the sounder's normal tone, to produce an attention-getting warble in the horn 32. This is because of the connection 40 in the circuit.

With the AND element 78 having two inputs at 84 and 76, the former intermittent and the latter steady, there will be an intermittent output at 96 operating into the amplifier 98 which in turn drives the lamps 26 causing same to flash.

If the fault or alarm which has occurred is a momentary one the circuits will still produce the same functions, namely—flashing lights and the sounder being ON. The reason for this is that the signal removed from the channel 60 when the alarm circuit is restored to normal will not affect the signal on 74, and hence the OR element 62 will still have an output. This type of structure is thus called a lock-up structure because it holds the alert conditions regardless of the nature of the change in the alarm circuit. The advantage of this type of circuit is that, while a fault may be self-correcting, there may be corollary occurrences which require correction or investigation, and it is important for the operator to locate the original fault, although no longer extant.

The next function to be discussed is that marked "alarm" on the chart of FIG. 3 in which the flashing of the lights is changed to a steady condition, and the sounder is turned off, if desired. This is accomplished by applying a suitable pulse to the supervisory circuit S-1 and to the sounder circuit 30 through the channels 44 and 39 by means of the ganged acknowledge switches 38 and 42. If desired the switches may be independent so that the sounder may be acknowledged, that is, turned off, by the switch 38' and the channel 39'. The acknowledgement of the supervisory circuit S–1 and the sounder circuit 30 is intended for the purpose of identifying the alarm point, perhaps from others which may come in to another time thereafter to cause flashing. It may also be for the purpose of turning off the annoyance of the horn 32.

The acknowledge signal to the supervisory circuit S–1 is in the form of a negative pulse applied to the input 66 of the MEMORY element 68. Note that this input channel cannot be made negative by anything occurring at 58. The acknowledge pulse could alternatingly be a positive pulse applied to the input 64. The MEMORY element 68 is restored to its normal state by the acknowledge pulse so that for the "alarm" function, there will be a steady state signal at 70, and no longer will there be a signal at 72. The steady state signal at 70 will override the intermittent signal from the flasher circuit 34 at 36, and the output of the OR element 82 will be a continuous signal. The input 74 to the OR element 62 having been eliminated, unless there is a signal at 60, there will be no output from the AND element 78. Because of this, if the fault or abnormal condition persists, the output from the AND element 78 is steady and the lights 26 will burn continuously, but if the fault has been corrected between the time it occurs and the time that the first acknowledgment has been made, the acknowledgment will directly restore the circuit to the condition designated by the bottom line of the chart of FIG. 3 with the lights out and the sounder off.

It will be noted that the condenser 80 which furnished the initial signal over lead 28 to the sounder circuit has by now been restored and as the condition of transistor Q–5 reverts to normal the condenser 80 starts to charge. As the transistor Q–6 will conduct only for the duration of the acknowledgment pulse and then revert, if the abnormal condition has not cleared, condenser 80 will not acquire any charge sufficient thereafter to result in a sounder operating pulse over lead 28. After the acknowledgment operation, if another supervisory circuit receives an abnormal signal to cause reversal of the memory 68 in that other supervisory circuit, the signal furnished to the sounder through a condenser corresponding to 80 and the diode corresponding to 81 now causes the sounder to warble. Thus a second alert condition is immediately noted. It will also be appreciated that dependent on whether or not the mentioned connection from lead 44 to transistor Q–2 is provided, the state of transistor Q–2 may be either reversed or not as desired by the acknowledgment pulse. As the acknowledgment pulse is of short duration, however, reversal of the states of Q–1 and Q–2 is immaterial, if the abnormal signal persists, as condenser 92 does not acquire any substantial charge during this duration.

Although there is only one acknowledge switch shown for all of the supervisory circuits S–1, S–2, S–3 and S–4, each time that one of the alarm circuits produces an "alert" condition, the acknowledgment of that condition changes the flashing light of that particular supervisory circuit into a steady one so that the operator will have the identification of the circuit with a continuous fault thereon. Thereafter other faults may occur on other alarm circuits, and each time that this occurs the particular supervisory circuit will cause its lights to flash and the sounder once more to sound, but this will have no effect upon the lights which are still burning steady. Acknowledgment of the new fault will turn off the sounder, and will change the flashing of the new supervisory circuit lights to steady, but will in no way affect the steady state condition of the first supervisory circuit.

The test switch 48 is indicated as an element 48 in FIG. 2 and it provides an input signal at the point 58 of all of the supervisory circuits of an annunciator of the type shown in FIG. 1. This enables all supervisory circuits to be tested at one time. A momentary opening of the circuit, for example, at 50 will perform this function. If one of the supervisory circuits is already flashing and sounding because of a permanent fault in its particular alarm circuit, the test switch 48 may be opened to make certain that all of the supervisory circuits are operative. When the acknowledge element 38/42 is activated, all of the lights will be extinguished except those of the supervisory circuit which has a true and continuous fault. The latter lights will burn steadily.

The next condition shown in the chart of FIG. 3 is marked "restore" and it represents the return of the alarm circuit to normal conditions. This will assume that the signal at 58 is removed. The resultant negative pulse will be applied through the condenser 92 and diode 88 to the input 64 to change the state of the MEMORY element 68 so that the output 70 loses its signal while a steady state signal appears at 72. The pulse thereby produced at 72 will go through condenser 80 and appear at input 28 and cause the sounder circuit 30 to operate the horn 32. The absence of signal at 70 removes the overriding signal into OR element 82 and hence the output at 84 is intermittent. With the signal on 74 giving OR element 62 an output at 76, the lights 26 will flash while the horn is sounding. This provides a positive indication that the trouble or abnormal condition has cleared.

The operator knows at this time that the circuit which had the fault is now at normal conditions, and hence he acknowledges by applying suitable signals at 39 and 44 and resets the entire circuit to normal condition to receive additional information from its alarm circuit. The lights go out and the horn goes off in a manner readily ascertained from the above explanation.

In the above discussions, reference made to "channels" is intended to signify circuits, but since it was desired to make the diagrams as simple as possible, the ground returns and power connections were not shown to give the diagrams close appearance to actual block or flow diagrams.

Figure 5:
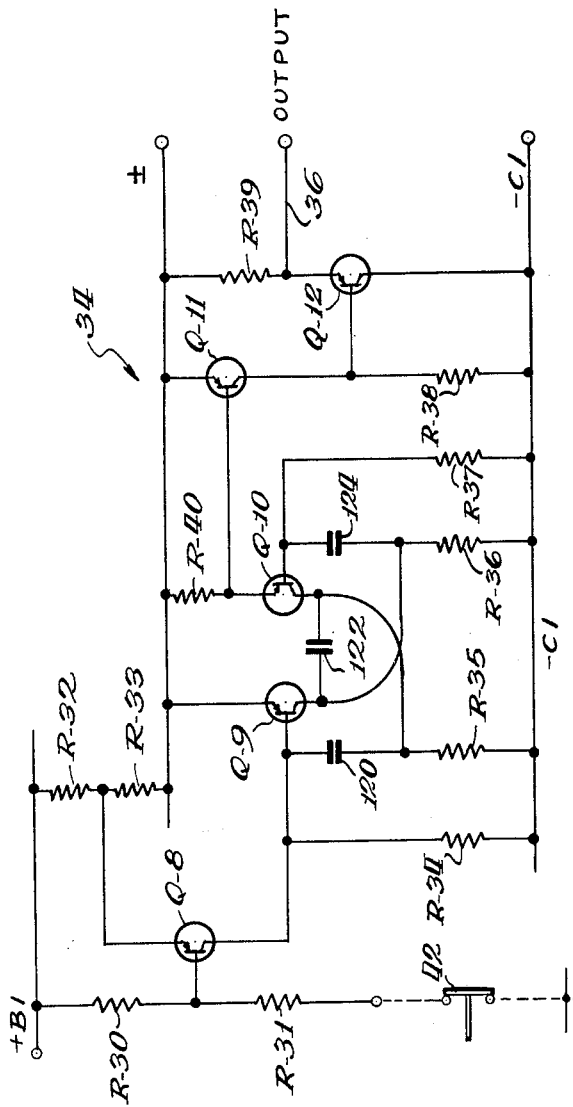
FIG. 5 is a circuit diagram of the flasher circuit of FIG. 1.

In FIGS. 4, 5 and 6 there are illustrated practical circuit diagrams of the supervisory circuit S–1, flasher circuit 34 and the sounder circuit 30 respectively. In these diagrams, a form of transistor convention is illustrated which has been used in recent explanatory diagrams in the art because it is more susceptible to the concept of "turning on" and "turning off," but no difference exists between these transistors and the conventional ones.

In FIG. 4, there is illustrated a diagram of any one of the surpervisory circuits, such as for example S–1. This circuit provides all of the logic elements of FIG. 2 to give the functions which are described in the chart of FIG. 3. For the input to the terminal A–1 there is provided a network having a low level input at 100 and a high level input at 102. The use of the circuit with a normally open alarm circuit requires the double pole, double throw switch 105 to be thrown to a right hand position B. Thus, as shown, the resistor R–2 is connected by way of lead 106 through resistor R6 to the collector electrode of transistor Q–1. This is the advantageous switch position for a normally open alarm circuit.

In the alternative, left hand, position A of the switch 105, accommodation is made for the normally connected alarm circuit. In this latter noted arrangement, the common negative lead —C1 is connected through lead 104 and resistor R6 to the collector electrode of transistor Q–1. At the same time, the resistor R–2 is connected through lead 107 to a junction point of terminals connected in common to the resistors R–5 and R–4 and to the base electrode of transistor Q–1. The specific refinements of the circuit need not be detailed, but are obvious from the diagram. External connections to the sounder, flasher and acknowledge circuits are shown.

The input to the supervisory circuit S–1 operates upon the triggering circuit which includes the transistors Q–1 and Q–2. Transistors Q–1 and Q–2 together with the input arrangement connected thereto, comprising resistors R1, R2 and the condenser connected therebetween to junction 100 are enabled to discriminate between spurious and true abnormal conditions. This serving, of course, a very important function in the operation of such a circuit arrangement. In addition the use of resistor R–5, which is optional can provide a number of advantages. Thus R–5, if used, transmits a negative potential from the collector circuit of Q–2, once Q–2 is cut off by receipt of an abnormal condition, to maintain Q–1 on and Q–2 off regardless of the removal of the fault or abnormal signal.

This circuit actually comprises a flip-flop circuit which is the equivalent of the NOT elements 54 and/or 56 that provides a pulse to the MEMORY element 68. In this circuit the MEMORY element is formed by a pair of cross-connected transistors Q–5 and Q–6 with associated circuit components R–18, R–20, R–21, R–19, R–22, R–23, R–24, R–25 and the condenser 108. The action is substantially as explained in connection with the logic diagram. The common output from the base terminals of both of the transistors Q–1 and Q–2 connects with the common base outputs of both transistors Q–5 and Q–6 to trigger them. The cross connection causes one to conduct while the other is cut off and vice versa. It will be noted that the use of capacitor 94 and rectifier 90 is also optional. Thus if resistor R–5 is omitted, transistors Q–1 and Q–2 can follow the receipt and disappearance of abnormal signals at input terminal 102 and if the connection provided to memory 68 through capacitor 94 and rectifier 90 is omitted only the negative swings on lead 58 resulting from the receipt of abnormal signals will be effective in setting the memory 68. However by providing capacitor 94 and rectifier 90 it is also possible to have the memory 68 follow a change in input at 102 indicating that the abnormal condition is alleviated and the normal condition reinstated.

The AND element 78 is formed of the transistors Q–3 and Q–4 which are connected effectively in series and both obviously must be conducting for the amplifier transistor Q–7 to establish current flow through the lamps 26 from the negative terminal 110 and a positive potential terminal 112. It will be noted that the use of transistors Q–3 and Q–4 in tandem as an AND gate permits the direct operation of the transistors Q–7 and energization of the lamps 26, thereby eliminating the need for an amplifying stage which would be ordinarily connected between each of the above transistors for translating the separate signals provided thereby into a value sufficient to operate a lamp or other element requiring heavy currents. It will be further noted that such arrangements and others in which certain components are combined to provide dual functions in different gates considerably simplifies the circuitry necessary to achieve the objectives of the invention and thereby enable the use of the circuit components contemplated herein in an economical fashion. The flasher signal is applied through the resistor R–15 to regularly interrupt the circuit. The MEMORY element output may override the flashing signal as seen from the circuit, the base of the transistor Q–3 having two inputs. Likewise, the base of the transistor Q–4 has two inputs representing the OR element 62 operating into a portion of the AND element 78. This AND element is in effect a double emitter-follower configuration. The OR elements in the circuit are multiple connections to the bases of the AND element transistors.

It will be noted that the acknowledge switch is required to re-set the flip-flop circuit Q–1 and Q–2, a connection not shown in the logic diagram, but this is a detail of physical construction which may be varied.

The circuit diagram of the flasher circuit 34 is shown in FIG. 5. This circuit is based upon an astable multivibrator using the cross-connected transistor Q–9 and Q–10 with the frequency determining components 120, 122, 124, R–35, R–36, R–40, R–34 and R–47. The output of the multivibrator is a fluctuating square wave signal at a relatively slow frequency, which is amplified by the transistors Q–11 and Q–12. The remaining components of the circuit have functions which are readily perceived. The acknowledge switch 42 is shown along with a transistor Q–8 that assures starting of the multivibrator when the circuit is energized.

In FIG. 6 there is illustrated a sounder circuit 30 which is intended to energize the horn 32. This circuit utilizes the signal which is applied from the supervisory circuit S–1 by way of the lead 28 to energize the memory circuit comprising the transistors Q–14 and Q–15 by way of an amplifier Q–13 so that it requires but a pulse to start the sounder operating. Output from the memory circuit is applied through a simple on-off transistor Q–16 to the oscillator formed of the transistors Q–17 and Q–18 with the frequency determining elements 134, 136, 138, R–64, R–65, R–66 and R–67 designed to provide an audio signal. The audio signal is transformer coupled through transformer T–1 to a pair of power amplifier transistors Q–20 and Q–21 which provide sufficient output to drive the horn 32 through an impedance matching transformer T–2. Since the frequency of the oscillator is also controlled by a transistor Q–19 in the feed-back path, and this latter transistor in turn is modulated by the flasher signal, the result is a very attention-demanding warble that overcomes all noise in the vicinity of the annunciator to call attention to an abnormal condition.

The sounder circuit has other uses besides association with an annunciator. Its warble is useful for danger signals in many locations such as in the vicinity of radiation and the like, and can be connected to the output of any detecting device to give warning of danger. The basic concept of the invention, however, does not require a warble, and the transistor Q–19 with the input from the flasher circuit may be eliminated.

In the circuit diagrams, many elements have been illustrated and numbered, for example the resistors being numbered through R–71, but without mention made of their function. For the most part the resistors are used for coupling circuits together, for biases, and for dropping voltages. Other illustrated elements are believed obvious.

Although the invention is capable of taking many physical forms, the commercial version preferably has been constructed using small insulating cards mounting the components of the supervisory circuits, and having separate cards for the flasher and sounder circuits. Power supplies are also capable of construction on such cards. The cards are provided with plug-in connections cooperating with mating components mounted in small cabinets. A complete assemblage of circuits for providing surveillance of six points was mounted in a cabinet substantially less than a cubic foot in volume.

In FIG. 7 there is illustrated a cabinet 150 which has six supervisory circuits mounted on cards and disposed with the lights forward as shown. The flasher and sounder circuits are on the bottom, and in this case, the bottom two supervisory circuit cards have been pulled out of place and laid upon the forward portions of the respective flasher and sounder circuit cards. The cards are of any suitable insulating material, and the series of pronged contacts shown at 152 engage in plugs not seen but disposed at the rear interior of the cabinet. There is a cover plate normally disposed over the front of the cabinet having windows with translucent marked glass to identify the lights.

It is believed that the invention should be understood from the above explanation, and it is obvious that considerable variation can be made without departing from the spirit of the invention as defined in the appended claims.

What it is desired to secure by Letters Patent is:

1. An annunciator which comprises, input means for connecting the annunciator to an alarm circuit which has normal and abnormal conditions, a memory element having a pair of output channels producing a signal on alternate channels only for each change of state of the memory element and the memory element adapted to change from one state to another upon being pulsed by a signal of predetermined polarity, but changing back to the first state only if pulsed by a signal of opposite polarity, means between the input means and the memory element for converting any change of condition of the alarm circuit into a pulse of one polarity only, first and second OR elements each having two inputs and one output, and AND element having both of the OR element outputs connected to its input and having an optical indicator in its output adapted to give an optical signal when energized, one of the two output channels which has a signal thereon for normal condition being connected to an input of said first OR element, the input means having a connection with the other input of said first OR element and adapted to apply a signal continuously thereto only when the alarm circuit is abnormal, the other of said output channels which has no signal thereon for normal condition being connected to one of the inputs of said second OR element, a continuous source of intermittent signal connected to the other of said inputs of said second OR element, and an independent acknowledge pulse means connected to the input of said memory element for applying a pulse of opposite polarity thereto to change said state when desired, the occurrence of abnormal condition in said alarm circuit causing a change in state of the memory element and providing an intermittent optical indication irrespective of whether the abnormal condition is momentary or continuous, and said optical signal being changed to continuous when said memory element is thereafter pulsed by said acknowledgment pulse means if the abnormal condition remains, or to become extinguished in the event the abnormal condition was momentary.

2. An annunciator according to claim 1 in which there is a sounder circuit connected with one of said output channels and means are provided whereby said sounder circuit is energized only upon a change of state of said memory element.

3. An annunciator in accordance with claim 2 in which said sounder circuit has a memory circuit therein such that the energization thereof will remain irrespective of any change in the input thereof, and in which means are provided to acknowledge the same by de-energizing the same manually.

4. An annunciator as claimed in claim 3 in which the acknowledge means for said sounder circuit and the independent acknowledge pulse means are ganged to operate together.

References Cited in the file of this patent
UNITED STATES PATENTS

| | | |
|---|---|---|
| 2,437,876 | Cohn | Mar. 16, 1948 |
| 2,712,129 | Marmorstone | June 28, 1955 |
| 2,730,704 | Warren | Jan. 10, 1956 |
| 2,836,713 | Scott | May 27, 1958 |
| 2,858,528 | Diener | Oct. 28, 1958 |
| 2,866,181 | Gordon | Dec. 23, 1958 |
| 2,891,195 | Smyth | June 16, 1959 |
| 2,910,688 | Kelley et al. | Oct. 27, 1959 |
| 2,917,731 | Rodgers | Dec. 15, 1959 |
| 2,926,339 | Kramer et al. | Feb. 23, 1960 |
| 2,931,018 | Tellefsen et al. | Mar. 29, 1960 |
| 2,987,632 | Milford | June 6, 1961 |
| 2,987,633 | Pallas | June 6, 1961 |
| 2,995,687 | Mayberry | Aug. 8, 1961 |
| 2,997,665 | Sylvan | Aug. 22, 1961 |
| 3,039,085 | Keller | June 12, 1962 |
| 3,099,826 | Noreen et al. | July 30, 1963 |

OTHER REFERENCES

Universal Panalarm "50"; Catalogue 100B; publication by Panalarm Products, Inc., Chicago, Illinois, pages 21–24, copyright 1952.